(12) United States Patent
Räsänen et al.

(10) Patent No.: US 9,944,425 B2
(45) Date of Patent: Apr. 17, 2018

(54) PACKAGING BOARD, ITS USE AND PRODUCTS MADE THEREOF

(71) Applicant: STORA ENSO OYJ, Helsinki (FI)

(72) Inventors: Jari Räsänen, Imatra (FI); Isto Heiskanen, Imatra (FI); Risto Laitinen, Imatra (FI)

(73) Assignee: STORA ENSO OYJ, Helsinki (FI)

( * ) Notice: Subject to any disclaimer, the term of this patent is extended or adjusted under 35 U.S.C. 154(b) by 964 days.

(21) Appl. No.: 14/350,616

(22) PCT Filed: Oct. 9, 2012

(86) PCT No.: PCT/FI2012/050971
§ 371 (c)(1),
(2) Date: Apr. 9, 2014

(87) PCT Pub. No.: WO2013/053997
PCT Pub. Date: Apr. 18, 2013

(65) Prior Publication Data
US 2014/0272213 A1 Sep. 18, 2014

(30) Foreign Application Priority Data
Oct. 10, 2011 (FI) .................................... 20115991

(51) Int. Cl.
| | | |
|---|---|---|
| *B65D 1/26* | (2006.01) | |
| *B32B 1/02* | (2006.01) | |
| *B65D 1/44* | (2006.01) | |
| *B65D 1/22* | (2006.01) | |
| *B32B 29/00* | (2006.01) | |
| *B32B 29/08* | (2006.01) | |
| *B32B 23/06* | (2006.01) | |
| *B32B 29/06* | (2006.01) | |
| *D21H 27/10* | (2006.01) | |
| *D21H 17/14* | (2006.01) | |
| *D21H 17/17* | (2006.01) | |
| *D21H 17/55* | (2006.01) | |
| *D21H 17/56* | (2006.01) | |
| *D21H 17/66* | (2006.01) | |
| *D21H 17/00* | (2006.01) | |
| *D21H 19/82* | (2006.01) | |

(Continued)

(52) U.S. Cl.
CPC .............. B65D 1/265 (2013.01); B32B 1/02 (2013.01); B32B 23/06 (2013.01); B32B 29/00 (2013.01); B32B 29/002 (2013.01); B32B 29/06 (2013.01); B32B 29/08 (2013.01); B65D 1/22 (2013.01); B65D 1/26 (2013.01); B65D 1/28 (2013.01); B65D 1/44 (2013.01); D21H 17/14 (2013.01); D21H 17/15 (2013.01); D21H 17/17 (2013.01); D21H 17/55 (2013.01); D21H 17/56 (2013.01); D21H 17/66 (2013.01); D21H 17/74 (2013.01); D21H 19/76 (2013.01); D21H 19/824 (2013.01); D21H 19/84 (2013.01); D21H 21/16 (2013.01); D21H 21/20 (2013.01); D21H 27/10 (2013.01); D21H 17/62 (2013.01); D21H 19/22 (2013.01); D21H 19/28 (2013.01); Y10T 428/1303 (2015.01); Y10T 428/277 (2015.01); Y10T 428/3179 (2015.04); Y10T 428/31783 (2015.04); Y10T 428/31786 (2015.04); Y10T 428/31895 (2015.04); Y10T 428/31902 (2015.04); Y10T 428/31993 (2015.04)

(58) Field of Classification Search
CPC . B65D 1/22; B65D 1/26; B65D 1/265; B65D 1/28; B65D 1/44; B32B 1/02; B32B 23/06; B32B 29/00; B32B 29/002; B32B 29/06; B32B 29/08; Y10T 428/1303; Y10T 428/3179; Y10T 428/31786; Y10T 428/31895
See application file for complete search history.

(56) References Cited

U.S. PATENT DOCUMENTS

| | | | | | |
|---|---|---|---|---|---|
| 4,296,012 | A | * | 10/1981 | Okumichi | .............. D21H 17/17 106/285 |
| 4,859,244 | A | * | 8/1989 | Floyd | .................... D21H 17/15 106/243 |

(Continued)

FOREIGN PATENT DOCUMENTS

| | | |
|---|---|---|
| EP | 0275851 A1 | 7/1988 |
| EP | 0 418 015 A1 | 3/1991 |

(Continued)

OTHER PUBLICATIONS

Japanese Office Action for Japanese Application No. 2014-535132, dated Sep. 13, 2016, with a partial English translation.

(Continued)

*Primary Examiner* — Walter B Aughenbaugh
(74) *Attorney, Agent, or Firm* — Birch, Stewart, Kolasch & Birch, LLP

(57) ABSTRACT

The invention relates to a packaging board comprising a fibrous base and one or more polymer coating layers on one or both sides of the fibrous base. According to the invention the fibrous base contains the combination of an alkyl ketene dimer size, stearic acid anhydride, a wet-strength size and an aluminium compound, which give the board resistance to aggressive liquids as well as thermal treatment, particularly an improved resistance to raw edge penetration in such circumstances. The invention further relates to containers and packages made of the board, for instance disposable drinking cups, dairy product cartons and auto-clave packages, as well as use of the board for such purposes.

11 Claims, No Drawings

(51) Int. Cl.
    *D21H 19/84*     (2006.01)
    *D21H 21/16*     (2006.01)
    *D21H 21/20*     (2006.01)
    *B65D 1/28*     (2006.01)
    *D21H 17/15*     (2006.01)
    *D21H 19/76*     (2006.01)
    *D21H 17/62*     (2006.01)
    *D21H 19/22*     (2006.01)
    *D21H 19/28*     (2006.01)

(56) References Cited

U.S. PATENT DOCUMENTS

| | | | |
|---|---|---|---|
| 4,927,496 A | 5/1990 | Walkden | |
| 5,068,139 A * | 11/1991 | McReynolds | B32B 27/10 162/156 |
| 5,374,335 A * | 12/1994 | Lindgren | D21H 17/68 162/158 |
| 6,113,986 A * | 9/2000 | Shanton | B05D 1/28 427/356 |
| 6,190,781 B1 * | 2/2001 | Tsubaki | G03C 1/775 428/32.21 |
| 6,268,414 B1 | 7/2001 | Lin | |
| 2011/0017417 A1 | 1/2011 | Ehrhardt | |
| 2011/0031156 A1 | 2/2011 | Heiskanen et al. | |

FOREIGN PATENT DOCUMENTS

| | | |
|---|---|---|
| EP | 1 770 213 A1 | 4/2007 |
| FI | 120903 B | 4/2010 |
| GB | 1 500 612 | 2/1978 |
| GB | 2 268 758 A | 1/1994 |
| JP | 63-179964 A | 7/1988 |
| WO | 2005/003460 A1 | 1/2005 |
| WO | 2009/125068 A1 | 10/2009 |

OTHER PUBLICATIONS

Extended European Search Report dated May 8, 2015, in European Patent Application No. 12840805.1.
Finnish Search Report—Patent No. 20115991 dated Jun. 4, 2012.
International Search Report issued in PCT/FI2012/050971 dated Feb. 7, 2013.
Written Opinion of the International Searching Authority issued in PCT/FI2012/050971 dated Feb. 7, 2013.

* cited by examiner

PACKAGING BOARD, ITS USE AND PRODUCTS MADE THEREOF

FIELD OF THE INVENTION

The invention relates to a packaging board comprising a fibrous base and one or more polymer coating layers on one or both sides of the fibrous base. The invention even includes products made of the packaging board of the invention as well as uses of said packaging board.

BACKGROUND

Polymer-coated packaging boards are used for packages and containers indented for liquid foodstuffs and other liquid-based or liquid containing products.

An inner polymer layer of the container or package protects the board from being moistened or wetted by liquid or moist substance contained therein. Depending on the polymers used the coating may also provide oxygen or flavour protection for products contained in the package.

An inner cutting edge (raw edge) of the board is exposed to liquid or moist products contained in a container, such as a disposable drinking cup, or a package, such as a milk or juice carton, so that the liquid has the possibility to get absorbed into the fibrous board base through this edge (raw edge penetration).

In an autoclave process there is also the problem of the exposed outer cutting edge absorbing moisture from the hot steam used for sterilization and also from the cold water used for cooling the autoclave-sterilized package.

To avoid these wetting problems the edge of the board can be skived and double folded around the edge, or the raw edges may be hidden by seaming tape. A more cost efficient way is to prevent liquid absorption by suitable sizing of the fibrous board base.

U.S. Pat. No. 4,859,244 describes paper products sized with alkyl ketene dimer (AKD), fatty acid anhydride such as stearic anhydride, and alum. The paper may be laminated on both sides with polyethylene film. The goal is to achieve resistance to raw edge penetration, and the paper is said to withstand alcoholic liquids, 5% aqueous ethanol being given as an example.

WO 2005/003460 A1 describes a packaging material and an autoclave package made thereof, wherein the raw edge penetration has been prevented by use of hydrophobic size such as AKD or alkenyl succinic acid anhydride (ASA), wet-strength size such as polyamido amine epichlorohydrin (PAAE), and an aluminium or calcium compound. The packaging material is aimed to withstand autoclaving with pressurized steam at an elevated temperature.

WO2009/125068 A1 describes a polymer-coated board intended in particular for drinking cups withstanding strong alcoholic drinks with an alcohol content of 30 wt-%. The problem is raw edge penetration on the cup inside, which is solved by a combination of AKD and PAAE sizes and specific requirements for the density of the fibrous base and the minimum amount of coating polymer.

It is known that different hydrophobic sizes give different repellence for different type of liquids. Hydrophobic sizes are in general effective against water, and some will give extra repellence for certain other liquids or compounds dissolved therein. AKD sizes for instance give repellence against lactic acid and are useful in connection with dairy products, but are ineffective against peroxides used for sterilizing the packages before filling. Rosin sizes instead work well with peroxides and are also suitable for disposable drinking cups, which are tarnished by hot coffee if made from AKD sized paperboard only.

It thus happens that there is no all-around size suitable for all liquids that packaging boards are typically used for or brought into contact with. Traditionally the solution has been so called dual sizing, for instance by combination of acidic rosin sizing and neutral AKD sizing. Such a combination is effective in dairy product packaging, in which the rosin size lets the packaging board withstand peroxide sterilization in the filling machine, and AKD size gives resistance to lactic acid that is present in milk and other dairy products being packaged.

However, dual sizing using rosin size and AKD size in combination is difficult, as rosin sizing requires use of alum and a low pH, whereas AKD sizing needs to be done at a neutral or high pH. This means that the pH must be very carefully controlled during board making and there is a high risk of running problems and precipitation of dirt and hydrophobic components in the board machine wet end.

Furthermore, there is still a general need for a sized packaging board that would have resistance including reduced raw edge penetration in different conditions, so as to be suitable for a variety of purposes, namely for packaging liquid foods such as dairy products, for packaging aggressive non-food liquids such as detergents, for disposable drinking cups for coffee and alcoholic drinks, as well as for autoclaved board packages.

DESCRIPTION OF THE INVENTION

The problem the present invention is aimed to solve is finding an all-purpose sized packaging board that could be used for product packages sterilized during filling, for product packages autoclaved after filling, for product packages repellent to and withstanding the packaged moist or liquid product, and for containers such as drinking cups withstanding different drinks that they are used for. The aim is in particular to find sizing that could be performed reliably, cost-effectively and without complicated pH adjustments and control during board manufacturing.

The solution according to the present invention is sizing the fibrous base of the packaging board with a combination of an alkyl ketene dimer (AKD) size, stearic acid anhydride (SA), a wet-strength size and an aluminium compound, which are giving the board resistance to dissolving liquids as well as thermal treatment.

The invention as defined above has been found to be applicable to a wide variety of desired purposes, while the manufacture of the board avoids the problems experienced in the prior art, in particular the difficult pH control as discussed above. The major benefits include use of the same board grade for several different end uses, this wide applicability bringing increased demand and larger-scale manufacturing with lesser changes of board grade at the machine, thus increasing efficiency and reducing unit manufacturing costs. The manufacturing process copes without changes of pH, brings greater purity of the product, and avoids the previous running problems at the machine.

In the pilot paper machine trials it has been found that by use of a mixture of

AKD and stearic acid anhydride together with an aluminium compound it is possible to make retortable/autoclave board and cup stock board that is resistant against detergents, strong alcohol, $H_2O_2$, black coffee, cream coffee, milk, oat milk etc. liquid foods, autoclaving at 135° C. for 40 min, followed by cold water cooling, and aseptic packaging.

The findings above mean that several different board grades/qualities as produced previously, such as detergent resistant cupboard or retortable board, may be replaced by a single product made according to the invention, by use of a single recipe.

The weight of the board base may vary from about 130 g/m² upwards, covering the paperboard and cardboard weights usual in connection with drinking cups and liquid carton packages.

The AKD size used in the invention preferably has a fatty acid carbon chain length of $C_{18}$-$C_{22}$. The AKD size can be traditional low melting point AKD or higher melting point AKD.

In addition to stearic acid anhydride the fibrous base may even contain anhydrides of shorter or longer-chained fatty acids, for instance palmitic acid anhydride. The stearic acid anhydride (SA-size) can thus be pure SA or a mixture of SA and one or more fatty acid anhydrides of a higher chain length. Too long carbon chains are disadvantageous, however, due to their slow settling on the fibre surface.

Preferably the wet-strength size is polyamido amine epichlorohydrin resin (PAAE). It has been found that there is major improvement if a relatively large amount of a wet strength agent is used, preferably at least 0.5 kg/t, more preferably at least 1 kg/t and most preferably at least 1.5 kg/t. The presence of the wet-strength size allows limitation of the amount of SA-size, which if excessively used would undesirably reduce friction on the board surface. Except for PAAE even other wet strength chemicals may be used.

The preferable aluminium compound being used is alum, particularly $KAl(SO_4)_2 \cdot 12(H_2O)$. As alternative Al compounds polyaluminium chloride (PAC) and silicate (PAS) may be mentioned. The aluminium compound is believed to contribute to binding the AKD and SA carbon chains at the board surfaces.

Preferably the AKD:SA weight ratio is in the range of 4:1 to 0.25:1, more preferably in the range of 2:1 to 0.5:1. An advantageous recipe for sizing the fibrous board base is 0.2 to 3.0 kg/t of AKD, 0.5 to 4.0 kg/t of SA, 0.5 to 2.0 kg/t of a wet strength size such as PAAE, and 0.5 to 10 kg/t of an aluminium compound.

As SA has a tendency to reduce the static friction of a board surface, which may cause difficulties in processing of the board base, it may be advantageous to keep the amount of SA in the sizing composition relatively low, SA thus constituting a minor component as compared to AKD. The fibrous board base could thus contain less than 0.9 kg/t of SA, preferably about 0.75 kg/t of SA.

In order to increase friction the fibrous board base may even contain 0.5 to 2.0 kg/t of rosin size, which is known to lend a high static friction to a board surface and better adhesion of a polymer coating layer.

The one or more polymer coating layers may comprise polyethylene, polypropene or polyester. The preferred choice for autoclave use is polypropene of polyester. Preferably the minimum weight of the polymer coating is 14 g/m², which avoids harmful air bubbles remaining between the board base and the polymer layers.

To achieve maximal resistance against aggressive chemicals such as strong alcohols or detergents, or harsh conditions such as autoclaving, hot filling etc., it is even beneficial to modify the physical properties of the board, mainly in regard of board porosity/density and the wet strength and swelling properties.

For instance, it has been found that the density of the fibrous board base preferably should be at least 600 kg/m³, preferably at least 650 kg/m³ and most preferably at least 700 kg/m³.

The invention further relates to board packages, which are made of the packaging board according the invention as claimed and discussed above. Such packages include autoclaved product packages, dairy product packages as well as detergent packages. Furthermore, the invention comprises open containers, e.g. a board drinking cup made of the packaging board of the invention as claimed.

The invention further relates to the use of the packaging board according to the invention for packages autoclaved at a temperature of at least 130° C., as well as to the use of the packaging board according to the invention for disposable drinking cups withstanding strong alcoholic drinks containing at least 30 vol-% of ethanol. Preferably the cup withstands drinks containing about 40 vol-% of ethanol.

EXAMPLE 1 (COMPARATIVE)

A fibrous board base having a density of 750 kg/m³ and a weight of 150 g/m² was made in a pilot paper machine at a machine speed of 45 m/min. The pulp stock was 100% birch refined to SR22-25. For sizing, 4 kg/t of rosin size and 10 kg/t of alum were added to the thick pulp, calculated per ton of the finished board base. The AKD grade used had a carbon chain length of $C_{18}$. Before the headbox the pulp stock was diluted with circulated white water having a pH of 6.5-6.8.

At first static friction was measured from the surface of the board base. To let raw edge penetration (REP) testing be performed before the final polymer coating step required in the invention, the board surfaces on both sides were masked with a plastic film, and the REP was measured in different liquids and conditions. The results were as follows:

| | |
|---|---|
| Lactic acid (1%) REP (24 h, 23° C.) | 14.0 kg/m² |
| REP $H_2O_2$ (10 min, 70° C.) | 0.6 kg/m² |
| REP coffee (10 min, 80° C.) | 2.4 kg/m² |
| REP 40 vol-% ethanol (1 h, 23° C.) | 7.0 kg/m² |
| autoclave REP (1 h, 125° C.) | 13.0 kg/m² |
| static friction | 0.5 |

EXAMPLE 2 (COMPARATIVE)

A fibrous board base was made in accordance with example 1, except for use of 1.5 kg/t of a 1:1 mixture of AKD and SA and 5 kg/t of alum for sizing. The finished board base was tested for static friction and REP as in example 1. The results were as follows:

| | |
|---|---|
| Lactic acid (1%) REP (24 h, 23° C.) | 2.3 kg/m² |
| REP $H_2O_2$ (10 min, 70° C.) | 0.3 kg/m² |
| REP coffee (10 min, 80° C.) | 3.7 kg/m² |
| REP 40 vol-% ethanol (1 h, 23° C.) | 7.0 kg/m² |
| autoclave REP (1 h, 125° C.) | 2.4 kg/m² |
| static friction | 0.27 |

EXAMPLE 3 (INVENTION)

A fibrous board base was made in accordance with example 1, except for use of 1.5 kg/t of a 1:1 mixture of AKD and SA, 1 kg/t of PAAE and 5 kg/t of alum for sizing.

The finished board base was tested for static friction and REP as in example 1. The results were as follows:

| | |
|---|---|
| Lactic acid (1%) REP (24 h, 23° C.) | 1.7 kg/m² |
| REP H₂O₂ (10 min, 70° C.) | 0.3 kg/m² |
| REP coffee (10 min, 80° C.) | 3.3 kg/m² |
| REP 40 vol-% ethanol (1 h, 23° C.) | 5.5 kg/m² |
| autoclave REP (1 h, 125° C.) | 2.3 kg/m² |
| static friction | 0.26 |

EXAMPLE 4 (COMPARATIVE)

A fibrous board base was made in accordance with example 1, except for use of 2.5 kg/t of a 1:1 mixture of AKD and SA and 5 kg/t of alum for sizing. The finished board base was tested for static friction and REP as in example 1. The results were as follows:

| | |
|---|---|
| Lactic acid (1%) REP (24 h, 23° C.) | 1.8 kg/m² |
| REP H₂O₂ (10 min, 70° C.) | 0.3 kg/m² |
| REP coffee (10 min, 80° C.) | 3.0 kg/m² |
| REP 40 vol-% ethanol (1 h, 23° C.) | 3.8 kg/m² |
| autoclave REP (1 h, 125° C.) | 2.3 kg/m² |
| static friction | 0.23 |

EXAMPLE 5 (COMPARATIVE)

A fibrous board base was made in accordance with example 1 and coated with 14 g/m² of polyethylene on one side and with 17 g/m² of polyethylene on the opposite side, for obtaining a cupboard suitable for the manufacture of disposable drinking cups. The coated cupboard was tested for the raw edge penetration (REP) by use of coloured liquids. The results were as follows:

| | |
|---|---|
| REP colored hot water (10 min, 93° C.) | <3 mm |
| REP cream coffee (10 min, 93° C.) | <3 mm |
| REP black coffee (10 min, 93° C.) | <11 mm |

EXAMPLE 6 (COMPARATIVE)

A fibrous board base was made in accordance with example 2 and coated with 14 g/m² of polyethylene on one side and with 17 g/m² of polyethylene on the opposite side, for obtaining a cupboard suitable for the manufacture of disposable drinking cups. The coated cupboard was tested for the raw edge penetration (REP) by use of coloured liquids. The results were as follows:

| | |
|---|---|
| REP colored hot water (10 min, 93° C.) | <4 mm |
| REP cream coffee (10 min, 93° C.) | <2 mm |
| REP black coffee (10 min, 93° C.) | <11 mm |

EXAMPLE 7 (INVENTION)

A fibrous board base was made in accordance with example 3 and coated with 14 g/m² of polyethylene on one side and with 17 g/m² of polyethylene on the opposite side, for obtaining a cupboard suitable for the manufacture of disposable drinking cups. The coated cupboard was tested for the raw edge penetration (REP) by use of coloured liquids. The results were as follows:

| | |
|---|---|
| REP colored hot water (10 min, 93° C.) | <1 mm |
| REP cream coffee (10 min, 93° C.) | <1 mm |
| REP black coffee (10 min, 93° C.) | <3 mm |

EXAMPLE 8 (COMPARATIVE)

A fibrous board base was made in accordance with example 4 and coated with 14 g/m² of polyethylene on one side and with 17 g/m² of polyethylene on the opposite side, for obtaining a cupboard suitable for the manufacture of disposable drinking cups. The coated cupboard was tested for the raw edge penetration (REP) by use of coloured liquids. The results were as follows:

| | |
|---|---|
| REP colored hot water (10 min, 93° C.) | <1 mm |
| REP cream coffee (10 min, 93° C.) | <1 mm |
| REP black coffee (10 min, 93° C.) | <2 mm |

The above examples 1-8 show that conventional rosin sizing performs quite badly in lactic acid and autoclave REP tests. Sizing with AKD and SA is a considerable improvement in both respects, but with hot black coffee marked colouring along the raw edges remains to be a problem. Increasing the amount of the AKD and SA sizes solves the problem with coffee, but an increased static friction is a significant disadvantage. Adding a corresponding amount of wet strength size instead, as taught by the present inventors, gives a similar improvement for coffee, while avoiding the static friction handicap. For overall performance the board according to the invention is found to be an improvement over the tested comparisons.

The invention claimed is:

1. A board drinking cup made with packaging board, said packaging board comprising a fibrous base and one or more polymer coating layers on one or both sides of the fibrous base, said cup being configured such that at least the inside of the cup is polymer-coated, wherein said fibrous base contains the combination of
   stearic acid anhydride (SA), present in an amount of less than 0.9 kg/t,
   an alkyl ketene dimer (AKD) size, present in an amount greater than the amount of SA which is present in the fibrous base,
   polyamido amine epichlorohydrin resin (PAAE) as a wet-strength size, and
   alum, said board having resistance to strong alcohol.

2. The drinking cup of claim 1, wherein the AKD size has a carbon chain length of $C_{18}$-$C_{22}$.

3. The drinking cup of claim 1 or 2, wherein the fibrous base also contains anhydride of a fatty acid having a chain longer than that of stearic acid.

4. The drinking cup of claim 1, wherein the fibrous board base contains 0.2 to 3.0 kg/t of AKD, 0.5 to 4.0 kg/t of SA, 0.5 to 2.0 kg/t of PAAE, and 0.5 to 10 kg/t of alum.

5. The drinking cup of claim 1, wherein the fibrous board base further contains 0.5 to 2.0 kg/t of rosin size.

6. The drinking cup of claim 1, wherein one or more of said one or more polymer coating layers comprises polyethylene, polypropene, or polyester.

7. The drinking cup of claim 6, wherein the total weight of one or more polymer coating layers on one side of the fibrous base is at least 14 g/m$^2$.

8. The drinking cup of claim 1, wherein the density of the fibrous board base is at least 600 kg/m$^3$.

9. The board drinking cup of claim 1, which is a disposable drinking cup, capable of withstanding strong alcoholic drinks containing at least 30 vol-% of ethanol.

10. The drinking cup of claim 1, wherein the fibrous base also contains palmitic acid anhydride.

11. The drinking cup of claim 1, wherein the fibrous board base contains less than 0.75 kg/t of SA.

* * * * *